INVENTORS
BERNARD L.A. VAN DER SCHEE
HANS NIEUWENHUIJSEN

United States Patent Office 3,498,762
Patented Mar. 3, 1970

3,498,762
APPARATUS FOR EVAPORATING FLUID COMPONENTS FROM VISCOUS LIQUIDS
Bernard L. A. van der Schee, Velp, Netherlands, and Hans Nieuwenhuijsen, Asheville, N.C., assignors to American Enka Corporation, Enka, N.C., a corporation of Delaware
Filed Jan. 10, 1967, Ser. No. 608,310
Claims priority, application Netherlands, Jan. 26, 1966, 6600964
Int. Cl. B01d 3/10
U.S. Cl. 23—285      4 Claims

ABSTRACT OF THE DISCLOSURE

Fluid components are evaporated from viscous liquids by use of apparatus comprising a horizontal vessel under vacuum containing parallel disposed drive shafts with agitators included therein, a plurality of pins fixed to the side wall of said vessel and intermeshing with said agitators, the latter being wheel shaped and having curved spokes on each agitator, the ends of said spokes are connected by at least one rim of smaller width than that of said spokes. Improved intermixing and evaporation of fluid components is achieved.

---

This invention relates to a process and apparatus for evaporative removal of volatile components entrained in highly viscous liquids.

The most pertinent prior art known to which this application refers is U.S. Patent No. 2,758,915.

Apparatus usually comprising an elongated substantially horizontal vessel connected to a source of vacuum and containing a plurality of rotatable pins or spoked wheels mounted on at least one drive shaft extending through the vessel for the purposes of degassifying highly viscous liquid masses are known. In such apparatuses, the pins or spokes, in a convenient manner, are affixed to the drive shaft and extend radially outward therefrom. Should the shaft be rotated, the pins and spokes entrain an increment of the liquid mass from the bottom of the vessel to momentarily expose the increment to an evaporative atmosphere, i.e., to the evaporative effect of reduced pressure in the vessel and/or to the effects of an inert gas passing there through to entrain and remove volatiles evolving from the mass. This rotating motion in the liquid also has the effect of mixing the mass and as a direct result thereof, portions of the liquid are continuously exposed to the surface in order to completely remove all gases entrained therein.

In general, evaporation of a gaseous component from a highly viscous liquid is often required in preparation of polymeric substances such as polyesters and polyamides by polycondensation (polymerization) techniques. In polycondensation reactions of the substances, the reaction is attended with an evolution of certain by-products, usually gaseous, which tend to react with the components of the reaction and therefore causing decomposition of some of polycondensate to undesirable lower molecular weight compounds. Consequently, obtaining a higher degree of polymerization in the polymeric product is therefore somewhat limited. In order to achieve an increased degree of polymerization, it has been found necessary to increase the rate or the speed of the polymerization reaction as high as possible in order that the decomposition reactions will not have time to develop. This permits an equilibrium between the primary reactants being quickly reached and will result in a higher degree of polymerization in the polymer product. Since the speed at which equilibrium can be reached is governed by the speed at which the by-products of polycondensation can be drawn off, it has therefore been found essential that the by-products, usually vaporous at the temperatures at which the reaction takes place, be removed as quickly as possible from the mixture. To this end, it is therefore necessary that the by-products of the reaction and particularly those by-products interspersed throughout the viscous mass of polymer being formed be brought to the surface of the mass as frequently and quickly as possible. In other words, a more effective means for rapidly regenerating surface areas in the reaction mixture is needed.

Mass flow by diffusion to the free surface of the viscous mass is proportional to the factor $A/\sqrt{t}$, wherein A is the area of the free surface and $t$ is the time elapsed since the surface has been formed. The formula is given to demonstrate the importance of the fact that the free or regenerated surface of the mass should have the largest possible area and should be formed and re-formed at the highest possible rate.

During polycondensation reactions, the melt viscosity of the reaction mixture gradually increases and as a direct result thereof, and particularly during polycondensation in a single apparatus for evaporating a fluid component from a reaction mixture, the hydrodynamic properties of the reaction will change considerably. Hence apparatus that may effect good evaporation of the gaseous components in a given range of viscosities of the reaction mixture will not be suitable at all for a mixture having different range of viscosities. Theoretically, there should always be a different optimumly constructed evaporation apparatus for each individual process stage of a polycondensation reaction in order to achieve optimum results. This, of course, is not practical and it is impossible to carry out reactions successfully and wherein numerous and different apparatuses are required to achieve the most optimum results.

It is therefore a prime object of this invention to provide an apparatus which rapidly and efficiently permits an increase in viscosity of materials being treated from a value ranging from 300–400 poises to approximately 17,-000–20,000 poises.

A further object of the invention is to provide a method for the preparation of high viscosity materials from low viscosity materials.

These and other objects are accomplished by constructing wheeled agitator elements in apparatus for increasing the viscosity of materials in a heretofore unknown manner. The spoked agitators are constructed in such manner that they are curved in an outward direction, counter to the direction of rotation of the wheels. Attached to the bottom of the vessel, and on each side of each wheel, stationary pins are fixed and are positioned in an oblique direction relative to the spokes. Further, the spokes support a band or rim-like member. The pins affixed to the vessel pass between the spokes and extend upwardly and almost to the drive shaft supporting the wheels.

The mixing apparatus with the agitator elements thus described has been found to permit a considerably higher rate of evaporation of gaseous components from liquid reaction mixtures than wheeled or pin type agitator apparatus formerly used. This is believed attributed mainly to the fact that liquid mixture on the bottom of the vessel is entrained by the agitators in thinner layers and partly to the fact that the mass is more thoroughly mixed. With apparatus, and particularly with apparatus using spokes or curved pins supported by a drive shaft of known construction, the mixture will stick to the agitators enmasse or globular form. This is in complete contradistinction to the present apparatus wherein the liquid mixture is entrained in a thin layer or film. Not only do the pins (which are affixed to the vessel) assist in forming a thin layer or surface of the mixture, they also act to break open any gas bubbles found in the mixture when passing through. Evaporation from the film is consequently more uniform and the evaporation rate is much higher owing to the fact that the fixed pins strip the reaction mixture off wheels and mix the mixture more thoroughly.

Improved mixing is also achieved due to the fact that the spokes are curved. This, in effect, causes a pumping action in the viscous liquid mixture. The thus shaped spokes, in combination with the fixed pins, act to pump the mixture in a radial direction and into contact with the bottom of the vessel and with the drive shaft. This affords a continual circulation and recirculation of the mixture and significantly contributes to more surface area exposure and a more thorough mixing within the vessel. In other words, it provides a continuous generation of a fresh evaporative surface to the action of convenient removal means for volatiles with which the apparatus may conveniently be afforded.

While so-called "pin mixers" are known, none are enclosed in a rim structure as is the case in the present invention. It has now been found, in the evaporation of highly viscous liquid materials, that the rim plays a significant role in degassification since it contributes significantly to forming the liquids into relatively thin films. A thin film layer is more easily to degassify than a globular or, in general, a larger bulky mass of material. The shape of the rims envisioned by the present invention may, of course, vary widely and in most cases the configuration directly depends on the viscosity of the liquid being treated. It is preferred to use a rim consisting of a single band and of smaller diameter than the spokes or; alternatively, in combination with a single band configuration, one consisting of two bands provided on either side of the spokes and attached to the ends thereof.

Generally, more favorable results are obtained if a number of spoked wheels are positioned at the outlet end of the vessel, and having a rim consisting of a single ring of smaller width than the spokes. The remaining wheels within a vessel are then provided with a rim consisting of two bands and on either side of the spokes. The bands should preferably be attached to the ends of the spokes.

Other constructions of the apparatus are conceivable. For example, the novel agitators may be mounted on a single drive shaft, or on a plurality of drive shafts. When a plurality of shafts are used the agitator wheels should be spaced some distance apart and preferably arranged in staggered relationship. Alternatively, they may be mounted in the same planes. It should be obvious that the capacity of an apparatus may be increased by increasing the number of drive shafts, and even perhaps while keeping the number of wheels per shaft and the dimensions of the wheels constant. However, it has been found that it is preferable to use a specific number of shafts and having a particular arrangement of wheels relative to each other. Accordingly, it has been found that better results are obtained when using an apparatus having wheels which alternately intermesh or overlap with each other. The spokes of wheels should be curved upwardly and in an upward direction relative the supporting and drive shaft. The wheels must be so driven then that, for both wheels, the intermeshing parts move in downward direction.

It perhaps should be noted that with known apparatus the spoked wheels are also mounted on two shafts. However in such known apparatus, attention should be focused on the fact that the shafts are driven in directions opposite to those of the apparatus presently contemplated. It has been found that with construction according to this invention, much better results are obtained and when the shafts are driven in the direction set forth above.

It further should be borne out that not only does the shape of the moving parts but also the construction of its stationary parts influences the effectiveness of the apparatus in removing the volatiles. The fixed pins of the invention in having the triangular cross-sectional shape act to split and tear the viscous material, particularly when the angular point of the pin is placed counter to the direction of rotation. And as an added significance, this particular shape also has a favorable effect on the power consumption; therefore, not only does the shape of the fixed pins have the advantage that stirring requires less energy, but it also results in a smaller amount of driving energy being converted into heat. The temperature of the reaction mixture can therefore be more readily controlled.

Another distinct advantage of the triangular cross-sectional shape of the fixed pins resides in the fact that the liquid films are more readily released therefrom. This permits formation of a more uniform liquid film. Further, the liquid is more readily detached from the bottom of the vessel if (viewed in the direction of rotation and beyond the fixed pins) the bottom abruptly recedes along the entire length of the vessel. The high-viscous liquid is, in effect, "torn" off the bottom of the vessel along the recess so that liquid resting on the bottom does not stick to the bottom and particularly in places where the liquid is refreshed only to a low degree.

In addition to the above-described apparatus, an invention is also contemplated in a method for preparation of polyethylene terephthalate by polycondensation. Synthetic condensation polyester of this basic synthetic linear proceeds very satisfactorily in at least one apparatus of the type according to the invention. The melt viscosity of the polymer increases from a value in the range 300 to 500 poises measured at 265° C. to a value in the range 17,000 to 20,000 poises measured at 280° C. According to the novel process contemplated, it is preferred that polycondensation up to a degree of polymerization of 80 to 90 at a temperature of 265° C. and a pressure of 6 millibars is carried out in a two-shaft apparatus comprising 20 to 28 pairs of wheels constructed according to the invention. The wheels should be in series and further polycondensation be carried out at a temperature of 280° C. and a pressure of 0.1 millibar and in a four-shaft apparatus comprising 60 to 80 double pairs of wheels in series.

The invention will be better understood by reference to the accompanying drawings in which.

Figure 1:
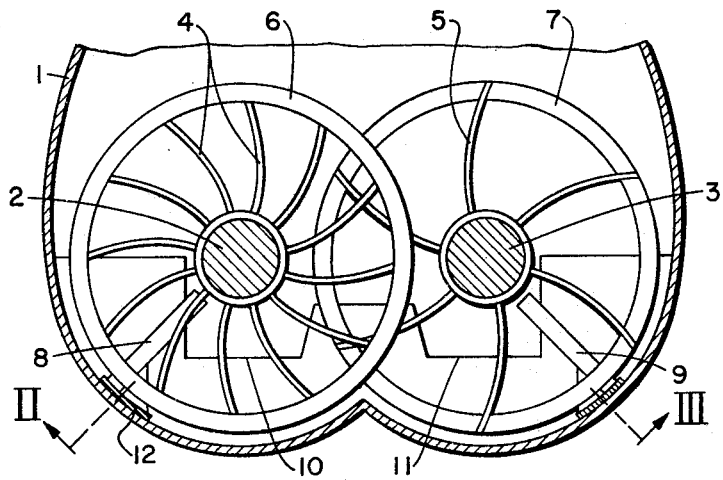
FIGURE 1 shows the apparatus of the invention in a cross-sectional view.

In FIGURE 1, numeral 1 refers to the wall of a vessel enclosing the novel agitator structure according to the invention. Two driving shafts 2 and 3 extend through the vessel and are rotated in the direction indicated by the arrow. The left-hand segment of the apparatus in FIGURE 1 shows an embodiment which is partly shown in FIGURE 2 (taken in longitudinal section along II—II in FIGURE 1). Similarly, the right half of FIGURE 1 shows a variant embodiment of the apparatus and which is partly shown in FIGURE 3 in longitudinal (section along III—III in FIGURE 1). It should be noted that in FIGURE 1 the embodiments are shown in one and the same figure. In practice, however, the left half and the right half of the apparatus of FIGURE 1 would be identical, and preferably would be constructed either in the way indicated in the left half of the figure, or in the way indicated in the right half thereof.

Attached to drive shaft 2 are twelve spokes 4. The spokes are curved counterclockwise and, as can be seen from FIGURE 2, the strip-shaped spokes are interconnected by means of two rims or bands 6. Circular bands 6 are provided on either side of the spokes.

With the embodiment as shown in the right half of FIGURE 1, only six spokes (5) are attached to drive shaft 3. The spokes are interconnected at their ends by a single ring 7. As can best be seen from FIGURE 3 (which shows a part of the apparatus in longitudinal section along III—III in FIGURE 1), the width of the ring 7 is much smaller than that of spokes 5.

Figure 4:
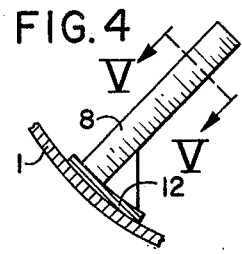
FIGURE 4 shows a detail of FIGURE 1 on a somewhat larger scale.

Fixed pins 8 and 9 extend between every two spoked wheels and are attached to the bottom of vessel 1. The pins extend to points in close proximity to driving shafts 2 and 3. FIGURE 4 shows how pin 8 is attached to the bottom 1 of the vessel; viz., by way of plate 12 and along the bottom of the vessel. To the left of pin 8 plate 12 ends in a sharp edge. The edge serves to abruptly tear the liquid entrained by the spoked wheels off the bottom of the vessel during rotation thereof. In such manner, unrenewed liquid sticking to the vessel bottom is prevented. Therefore degradation products resulting from unrenewed liquid will be prevented.

Figure 5:
FIGURE 5 shows the detail of FIGURE 4 in cross-section along lines V—V.

FIGURE 5 shows the pin as shown in FIGURE 4 in cross-section and along V—V. Fixed pin 8 has a triangular cross-sectional shape, with one of the angles positioned counter to the direction of rotation of the spoked wheel. As a direct result, fixed pin 8 acts to cut through the liquid, and the other two angles of intersection makes it possible for the liquid to be readily released from the fixed pins. The sharp edges formed by the angles of intersection of the sides of the pins ensure that the liquid is "torn" off the pins.

By varying the width of the spokes the distance between the spoked wheels and the width of the fixed pins, any desired clearance therebetween may be realized. This clearance is one of the factors governing the amount of liquid entrained by the wheels and from the liquid mass on the bottom of the vessel; i.e., the higher the viscosity of the liquid, a larger distance between the wheels is desirable.

Figure 2:
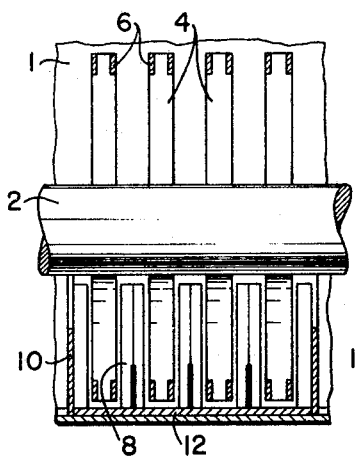
FIGURE 2 shows part of the same apparatus in longitudinal section.
Figure 3:
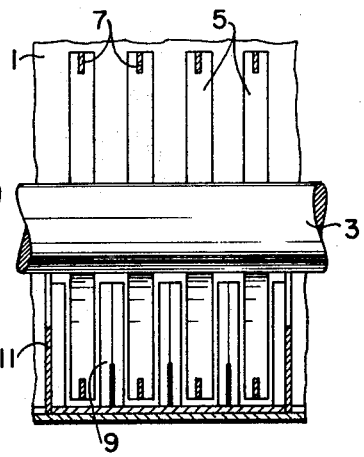
FIGURE 3 shows variant construction of the part shown in FIGURE 2.

The construction of the spoked wheels shown in FIGURE 2 is preferred providing the liquid viscosity does not exceed 800 to 1000 poises. At higher viscosities it is preferred to use construction as shown in FIGURE 3. This is due to the fact that at relatively low viscosities the weight of the liquid plays a greater role than at the relatively high viscosities. In order to prevent the films formed between the spokes 4 from breaking under their own weight, the distance between the spokes must not be excessive, and rim 6 must offer a large surface area to which the liquid being degassed may stick. With construction wherein rim 6 consists of two rings, the surface area is sufficiently large. Additional films are then formed between the two rings which has a further favorable effect on the evaporation. In the case where high viscosities are used or found, the risk of the films between the spokes breaking under their own weight will be smaller and, therefore, the distance between the spokes can be chosen greater. Perhaps moreover, it will then no longer be preferred that rim 7 in fact consist of a double ring. In order that the surface to which a liquid rests might stick may be kept as small as possible (to minimize the spread in the residence time of the liquid) the number of spokes utilizing construction of FIGURE 3 can be reduced to six, and double ring 6 can be replaced by single ring 7.

An overflow partition is provided between every four spoked wheels. Edges 10 and 11 of the partitions are shaped in such manner that the flow of liquid thereover is practically independent of the speed of the spoked wheels. These overflow partitions contribute to a uniform liquid increment flow through the apparatus.

What is claimed is:
1. An apparatus for evaporating fluid components from highly viscous liquids comprising:
  (a) a substantially horizontal vessel having side and end walls and being adapted to be connected to a vacuum source,
  (b) at least two horizontally disposed drive shafts supported within said vessel and arranged parallel to each other and to the side wall of said vessel,
  (c) a series of agitators mounted on each of said shafts,
  (d) a plurality of pins fixed to the side wall of said vessel and adapted to intermesh with said agitators,
  (e) said agitators being wheel shaped and having spokes curved counter to the direction of shaft rotation with the ends of the spokes on each agitator being connected to each other by at least one rim of smaller width than the spokes, and
  (f) said agitators and pins cooperating to divide and continually regenerate a new surface of the liquid being treated within the vessel.

2. Apparatus according to claim 1 wherein said rim comprises two bands, one on each side of the ends of said wheel spokes.

3. Apparatus according to claim 1 wherein a plurality of said agitators are positioned at an outlet end of said vessel and comprise spoked wheel means having a single rim band, the remainder of said spoked wheels in said vessel having two rim bands, one on each side of the spokes of each wheel.

4. Apparatus according to claim 1 wherein said fixed pins are triangular in shape with one angle thereof affixed counter to the direction of rotation of the agitators on each of said shafts.

References Cited
UNITED STATES PATENTS
2,538,466  1/1951  Marco _____ 259—9
2,758,915  8/1956  Vodonik _____ 259—104 XR

FOREIGN PATENTS
854,037  11/1960  Great Britain.

JAMES H. TAYMAN, Jr., Primary Examiner

U.S. Cl. X.R.

23—263; 55—52; 159—25, 10, 49; 259—6, 9, 10, 104; 260—75, 95